(12) United States Patent
Shintani et al.

(10) Patent No.: US 10,349,122 B2
(45) Date of Patent: Jul. 9, 2019

(54) ACCESSIBILITY FOR THE HEARING-IMPAIRED USING KEYWORD TO ESTABLISH AUDIO SETTINGS

(71) Applicant: Sony Corporation, Tokyo (JP)

(72) Inventors: Peter Shintani, San Diego, CA (US); Brant Candelore, Escondido, CA (US); Mahyar Nejat, San Diego, CA (US); Robert Noel Blanchard, Escondido, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/837,523

(22) Filed: Dec. 11, 2017

(65) Prior Publication Data

US 2019/0182536 A1 Jun. 13, 2019

(51) Int. Cl.
| | |
|---|---|
| H04N 21/439 | (2011.01) |
| G10L 15/22 | (2006.01) |
| H04N 21/422 | (2011.01) |
| H04N 21/6587 | (2011.01) |
| H04N 21/4415 | (2011.01) |
| H04R 25/00 | (2006.01) |

(52) U.S. Cl.
CPC .......... *H04N 21/439* (2013.01); *G10L 15/22* (2013.01); *H04N 21/42203* (2013.01); *H04N 21/4415* (2013.01); *H04N 21/6587* (2013.01); *H04R 25/55* (2013.01); *G10L 2015/223* (2013.01); *H04R 2225/41* (2013.01); *H04R 2225/43* (2013.01); *H04R 2430/01* (2013.01)

(58) Field of Classification Search
CPC ................................................ H04R 2225/41
See application file for complete search history.

(56) References Cited

U.S. PATENT DOCUMENTS

| | | | |
|---|---|---|---|
| 9,124,984 B2 | 9/2015 | Yamada et al. | |
| 9,324,322 B1* | 4/2016 | Torok | G10L 15/22 |
| 9,374,649 B2 | 6/2016 | Krystek et al. | |
| 9,510,112 B2 | 11/2016 | Petersen et al. | |
| 9,746,916 B2 | 8/2017 | Kim et al. | |
| 2002/0091337 A1* | 7/2002 | Adams | H04R 25/554 |
| | | | 600/559 |
| 2008/0059195 A1* | 3/2008 | Brown | 704/270 |
| 2012/0128187 A1* | 5/2012 | Yamada | H04R 25/407 |
| | | | 381/313 |
| 2014/0094151 A1* | 4/2014 | Klappert | H04M 1/6083 |
| | | | 455/414.1 |

OTHER PUBLICATIONS

"ReSound LiNX2: The world's first full family of smart hearing aids", hearingtracker.com. Retrieved on Sep. 25, 2017 from https://www.hearingtracker.com/media-files/release_70_linx2_professionalbrochure_mk604277_revb-ashx.pdf.

\* cited by examiner

*Primary Examiner* — Feng-Tzer Tzeng
(74) *Attorney, Agent, or Firm* — John L. Rogitz

(57) ABSTRACT

An audio video display device executes a voice assistant that recognizes a spoken name associated with a hearing-impaired person and in response reduces the audio volume for the content being decoded, on the assumption that someone is speaking to the hearing-impaired person, and/or pauses the content being decoded, and/or determines the location of the source of the command and steers a microphone array to that location, and/or allows for independent volume/mute controls via an assistive listening device such as a neck loop to control the volume or mute the audio played on hearing aids independently of the volume of the display device.

20 Claims, 4 Drawing Sheets

ACCESSIBILITY FOR THE HEARING-IMPAIRED USING KEYWORD TO ESTABLISH AUDIO SETTINGS

FIELD

The present application relates to technically inventive, non-routine solutions that are necessarily rooted in computer technology and that produce concrete technical improvements.

BACKGROUND

Hearing impaired people can experience difficulty hearing audio from display systems such as TVs. Accessibility solutions for the hearing impaired include TV subtitles. Subtitles not only obscure the video, but require active reading, which distracts from the "lean-back" experience people typically expect from watching TV. While hearing-impaired people can alleviate somewhat the problem of hearing the audio by using hearing aids, even with hearing aids a common complaint is that speech may not be easily comprehended through the hearing aids.

SUMMARY

Present principles recognize the above problems experienced by hearing-impaired people. Accordingly, in one aspect a device includes at least one computer memory that is not a transitory signal and that in turn includes instructions executable by at least one processor to receive voice input, and responsive to the voice input matching a first command, alter audio presentation associated with an audio video program being presented on an audio video device (AVD). The altering can include one or more of reducing audio volume of the AVD, pausing presentation of content on the AVD, steering at least one microphone toward a source of the voice input, and allowing for audio control of the AVD independently of audio control of a hearing aid to which the AVD streams audio.

In another aspect, a method includes establishing a first audio mode in an audio video presentation system (AVPS). The first audio mode includes a standalone mode in which an audio video display device (AVDD) outputs audio on at least one speaker of the AVDD. The method also includes establishing a second audio mode in the AVPS in which the AVDD streams audio to at least one hearing aid paired with the AVDD but does not stream ambient sound detected by at least one microphone of the AVPS to the hearing aid. The method yet again includes establishing a third audio mode in the AVPS in which the AVDD streams audio to at least one hearing aid paired with the AVDD and also streams ambient sound detected by at least one microphone of the AVPS to the hearing aid.

In another aspect, an audio video assembly (AVA) includes at least one display for presenting video under control of at least one processor, and at least one speaker for presenting audio under control of at least one processor, which may be the same processor controlling the display or a different processor. The assembly also includes at least one storage including instructions executable by at least one processor (such as the display processor or speaker processor if different from the display processor) to establish a first audio mode in the AVA in which an audio video display device (AVDD) of the AVA streams audio to at least one hearing aid paired with the AVDD but does not stream ambient sound detected by at least one microphone of the AVA to the hearing aid. The instructions are executable to establish a second audio mode in the AVA in which the AVDD streams audio to at least one hearing aid paired with the AVDD and also streams ambient sound detected by at least one microphone of the AVA to the hearing aid.

The details of the present disclosure, both as to its structure and operation, can be best understood in reference to the accompanying drawings, in which like reference numerals refer to like parts, and in which:

DETAILED DESCRIPTION

Figure 1:
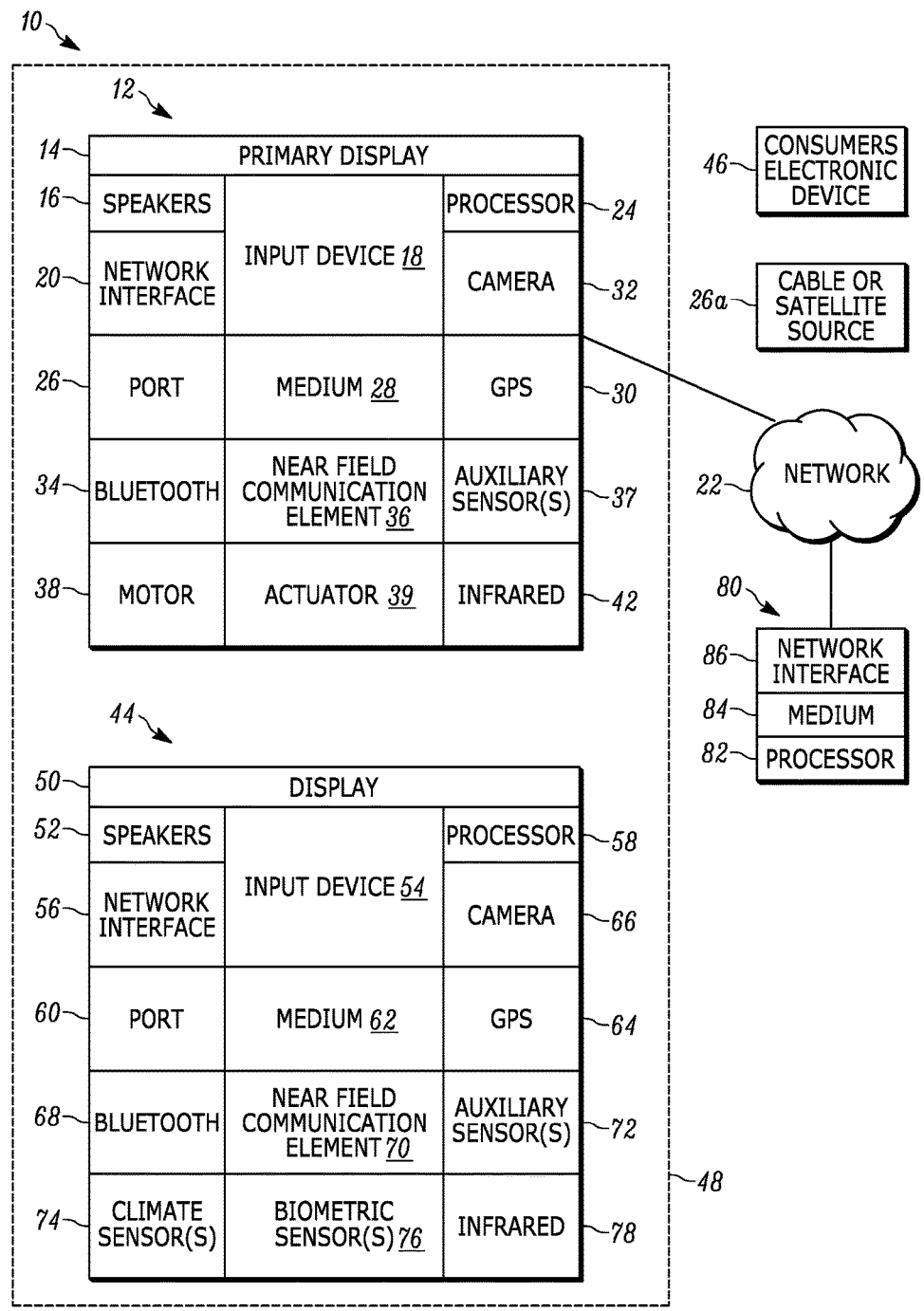
FIG. 1 is a block diagram of an example system including an example in accordance with present principles.

This disclosure relates generally to computer ecosystems including aspects of consumer electronics (CE) device based user information in computer ecosystems. A system herein may include server and client components, connected over a network such that data may be exchanged between the client and server components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access web applications hosted by the Internet servers discussed below.

Servers may include one or more processors executing instructions that configure the servers to receive and transmit data over a network such as the Internet. Or, a client and server can be connected over a local intranet or a virtual private network. A server or controller may be instantiated by a game console such as a Sony Playstation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof, hence, illustrative components, blocks, modules, circuits, and steps are set forth in terms of their functionality.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example ecosystem 10 is shown, which may include one or more of the example devices mentioned above and described further below in accordance with present principles. The first of the example devices included in the system 10 is an example primary display device, and in the embodiment shown is an audio video display device (AVDD) 12 such as but not limited to an Internet-enabled TV. Thus, the AVDD 12 alternatively may be an appliance or household item, e.g. computerized Internet enabled refrigerator, washer, or dryer. The AVDD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVDD 12 is configured to undertake present principles (e.g. communicate with other CE devices to undertake present principles, execute the logic described herein, and perform any other functions and/or operations described herein).

Accordingly, to undertake such principles the AVDD 12 can be established by some or all of the components shown in FIG. 1. For example, the AVDD 12 can include one or more displays 14 that may be implemented by a high definition or ultra-high definition "4K" or "8K" (or higher resolution) flat screen and that may be touch-enabled for receiving consumer input signals via touches on the display. The AVDD 12 may include one or more speakers 16 for outputting audio in accordance with present principles, and at least one additional input device 18 such as e.g. an audio receiver/microphone for e.g. entering audible commands to the AVDD 12 to control the AVDD 12. The example AVDD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface. It is to be understood that the processor 24 controls the AVDD 12 to undertake present principles, including the other elements of the AVDD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVDD 12 may also include one or more input ports 26 such as, e.g., a USB port to physically connect (e.g. using a wired connection) to another CE device and/or a headphone port to connect headphones to the AVDD 12 for presentation of audio from the AVDD 12 to a consumer through the headphones. The AVDD 12 may further include one or more computer memories 28 that are not transitory signals, such as disk-based or solid-state storage (including but not limited to flash memory). Also in some embodiments, the AVDD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVDD 12 is disposed in conjunction with the processor 24. However, it is to be understood that that another suitable position receiver other than a cellphone receiver, GPS receiver and/or altimeter may be used in accordance with present principles to e.g. determine the location of the AVDD 12 in e.g. all three dimensions.

Continuing the description of the AVDD 12, in some embodiments the AVDD 12 may include one or more cameras 32 that may be, e.g., a thermal imaging camera, a digital camera such as a webcam, and/or a camera integrated into the AVDD 12 and controllable by the processor 24 to gather pictures/images and/or video in accordance with present principles. Also included on the AVDD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVDD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command, etc.) providing input to the processor 24. The AVDD 12 may include still other sensors such as e.g. one or more climate sensors 38 (e.g. barometers, humidity sensors, wind sensors, light sensors, temperature sensors, etc.) and/or one or more biometric sensors 40 providing input to the processor 24. In addition to the foregoing, it is noted that the AVDD 12 may also include an infrared (IR) transmitter and/or IR receiver and/or IR transceiver 42 such as an IR data association (IRDA) device. A battery (not shown) may be provided for powering the AVDD 12.

Still referring to FIG. 1, in addition to the AVDD 12, the system 10 may include one or more other CE device types. In one example, a first CE device 44 may be used to control the display via commands sent through the below-described server while a second CE device 46 may include similar components as the first CE device 44 and hence will not be discussed in detail. In the example shown, only two CE devices 44, 46 are shown, it being understood that fewer or greater devices may be used.

In the example shown, to illustrate present principles all three devices 12, 44, 46 are assumed to be members of an entertainment network in, e.g., in a home, or at least to be present in proximity to each other in a location such as a house. However, for illustrating present principles the first CE device 44 is assumed to be in the same room as the AVDD 12, bounded by walls illustrated by dashed lines 48.

The example non-limiting first CE device 44 may be established by any one of the above-mentioned devices, for example, a portable wireless laptop computer or notebook computer, and accordingly may have one or more of the components described below. The second CE device 46 without limitation may be established by a wireless telephone. The second CE device 46 may implement a portable hand-held remote control (RC).

The first CE device 44 may include one or more displays 50 that may be touch-enabled for receiving consumer input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. Thus, the interface 56 may be, without limitation, a Wi-Fi transceiver, which is an example of a wireless computer network interface. It is to be understood that the processor 58 may control the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a USB port to physically connect (e.g. using a wired connection) to another CE device and/or a headphone port to connect headphones to the first CE device 44 for presentation of audio from the first CE device 44 to a consumer through the headphones. The first CE device 44 may further include one or more computer memories 62 such as disk-based or solid-state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command, etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44.

The second CE device 46 may include some or all of the components shown for the CE device 44. Note that the second CE device 46 may be implemented as hearing aids that can be worn on or in the ear, including implantable aids, and that typically include one or more hearing aid speakers, one or more microphones, a processor, a computer storage, and a wireless transceiver, in addition to other appropriate components.

Now in reference to the afore-mentioned at least one server 80, it includes at least one server processor 82, at least one computer memory 84 such as disk-based or solid-state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server, and may include and perform "cloud"

functions such that the devices of the system 10 may access a "cloud" environment via the server 80 in example embodiments. Or, the server 80 may be implemented by a game console or other computer in the same room as the other devices shown in FIG. 1 or nearby.

Figure 2:
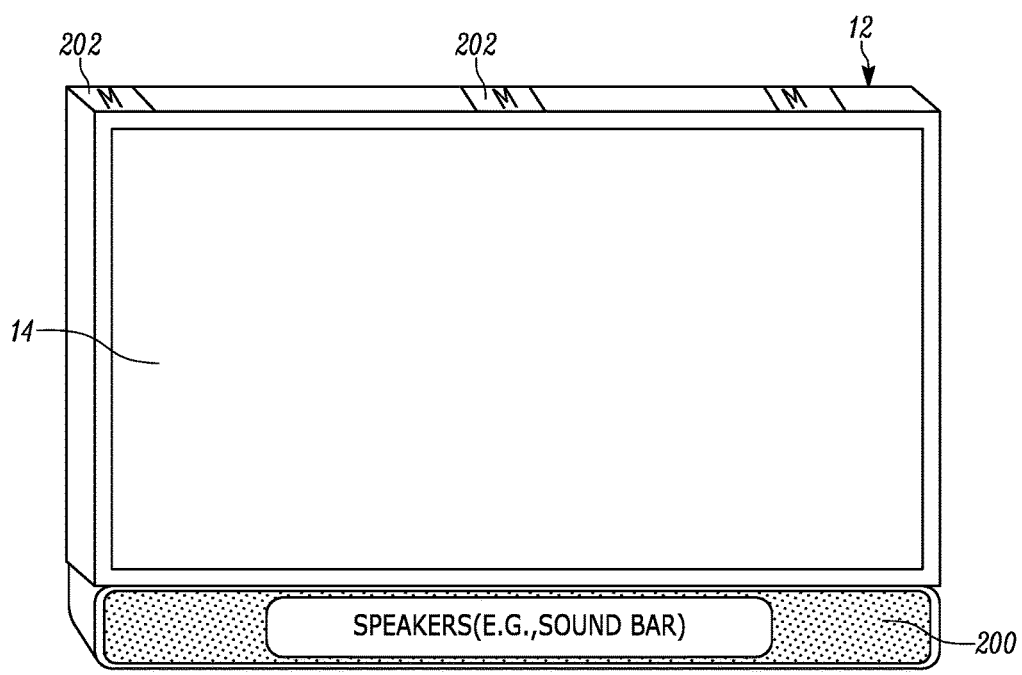
FIG. 2 is a schematic diagram of the audio video display device (AVDD) shown in FIG. 1, illustrating speakers.

FIG. 2 shows that the AVDD 12 may include one or more speakers 200, in some example non-limiting embodiments configured as a Sony sound bar. Other speaker systems are envisioned, such as built-in TV speakers, audio video receivers (AVR), a surround sound system (e.g., a sound bar plus additional surround-sound speakers or an AVR with multiple speakers), etc. The AVDD 12 may also include one or more microphones 202 that can be electronically or mechanically steerable.

Figure 3:
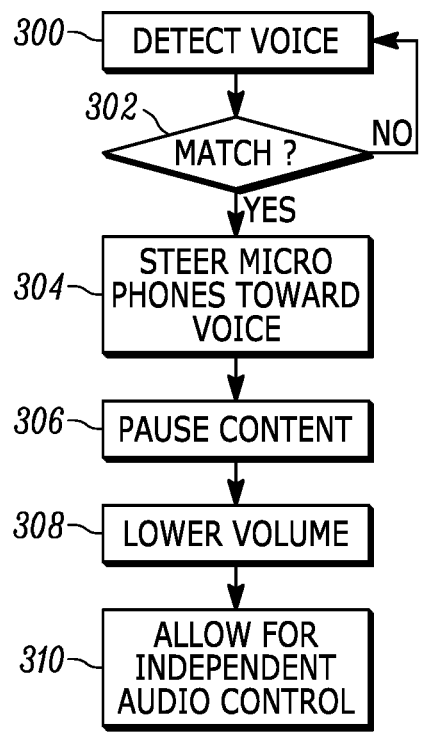
FIG. 3 is a flow chart of example logic for altering audio responsive to detecting the name of a hearing-impaired person consistent with present principles.

FIG. 3 illustrates that at block 300, a processor such as the AVDD processor described above may receive voice input. The processor may determine at decision diamond 302 whether the voice input matches a "wake up" word in order to access voice recognition functions to effectively allow the AVDD to detect that someone is trying to talk to a person with a hearing aid that is watching the TV, in which case the wake-up word may be the name of the hearing-impaired person.

Upon recognition of the wake-up word, the AVDD may execute one or more of the actions represented in blocks 304-310. For example, at block 304 the microphones 202 may be steered mechanically or electronically toward the location from which the wake-up word was received as determined by triangulation executed on different times of receipt of the wake-up word by the different microphones 202. This accounts for the assumption that the speaker is nearby the hearing-impaired person and that subsequent commands may come from the general bearing along which the wake-up word was received.

Also, or alternatively, at block 306 content being played on the AVDD may be paused and/or volume of the AVDD may be lowered at block 308 on the assumption that the hearing-impaired person may have difficulty listening to the human speaker who is addressing him if the volume or sound from the AVDD remains relatively high. In other words, the audio volume may be reduced or muted entirely for the content being decoded by the AVDD (which may be output audibly or via Bluetooth—this would be appropriate for over-the-air or cable broadcast content) an/or the content being decoded may be paused if the content is streamed from a pausable source (e.g., content is locally stored on the TV or set-top box or from a website).

Also, or alternatively, at block 310 the AVDD may be configured to allow for independent volume/mute controls via an assistive listening device (intermediary device), if used. For example, a neck loop with controls for raising and lowering and muting the volume streamed from the AVDD to hearing aids associated with the neck loop may be enabled independent of volume control for the AVDD. This allows others in the room apart from the hearing-impaired person to continuing listening to the AVDD.

Figure 4:
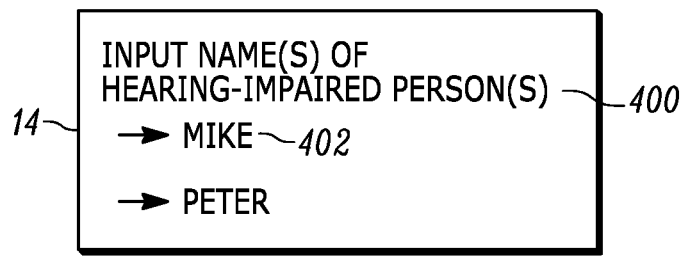
FIG. 4 is a screen shot of an example user interface (UI) consistent with present principles for establishing the name as a keyword.

FIG. 4 shows a user interface (UI) 400 that be presented on the AVDD display 14 as an example to prompt entry into fields 402 of the name of one or more hearing-impaired people to establish respective wake up words consistent with disclosure above.

Figure 5:
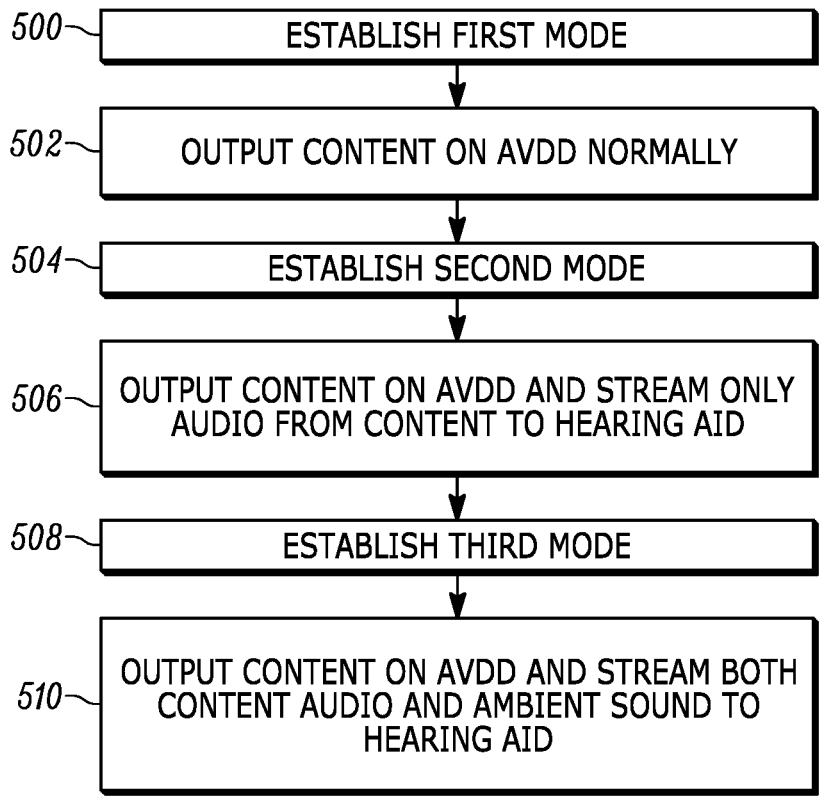
FIG. 5 is a flow chart of example logic for establishing an audio output mode consistent with present principles.

One of the biggest complaints with hearing aids is comprehension of speech. Present principles provide techniques for the AVDD with the hearing aid assistant to help with comprehension of speech in different configurations. FIG. 5 illustrates.

At block 500, a first audio mode is established by the system. In the first audio mode, at block 502 content including audio is output on the AVDD as during normal play.

In this mode, in some implementations no audio is streamed from the AVDD to hearing aids A second audio mode may be established at block 504 in which, at block 506, audio and video content are output on the AVDD and the AVDD streams only the audio content to hearing aids. Yet again, at block 508 a third audio mode may be established such that at block 510 audio and video content are output on the AVDD and the AVDD streams both the audio content to hearing aids, as well as ambient sounds such as speech picked up the microphones 202 to the hearing aids.

Which one of the above modes is established may occur automatically, e.g., upon imaging a person with a camera or voice fingerprinting the person using input from the microphones and correlating the person to a profile indicating which mode the person is associated with. Or, the person's profile mode may be established upon detecting, as a trigger word, the name of the person as spoken into the microphones 202.

Figure 6:
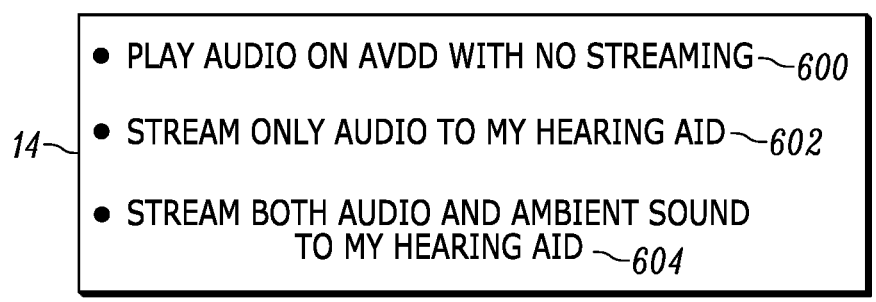
FIG. 6 is a screen shot of an example UI consistent with present principles for establishing the audio output mode.

FIG. 6 illustrates a UI listing the above three modes at 600, 602, and 604, respectively for selection of one of the modes either for immediate implementation on the AVDD and/or to associate the selected mode with the person's profile. Subsequently upon sign in the person's profile settings may be looked up and established in the AVDD, including the audio output mode selected.

The AVDD can be paired with hearing aids using, e.g., Bluetooth low energy or Bluetooth.

Note that independent volume control can be provided for content being decoded and played on the AVDD and streamed to the hearing aids and the ambient sound. If the processor determines that the conversation between the viewer and other person has stopped, the content can resume (if paused) and the content audio volume can go back to normal. Thus, for instance, responsive to detecting speech satisfying a criteria such as matching a person's name, being content output by the AVDD may be paused/lowered while responsive to not detecting speech for a threshold period, play of content output by the AVDD as well as audio being streamed to the hearing aids may be resumed.

While particular techniques are herein shown and described in detail, it is to be understood that the subject matter which is encompassed by the present application is limited only by the claims.

What is claimed is:

1. A device comprising:
    at least one computer memory that is not a transitory signal and that comprises instructions executable by at least one processor in an audio video device (AVD) to:
    receive voice input;
    responsive to the voice input matching a first command, alter audio presentation associated with an audio video program being presented on the AVD;
    establish a first audio mode in which the AVD streams audio to at least one hearing aid paired with the AVD but does not stream ambient sound detected by at least one microphone of the AVD to the hearing aid; and
    establish a second audio mode in which the AVD streams audio to at least one hearing aid paired with the AVD and also streams ambient sound detected by at least one microphone of the AVD to the hearing aid.

2. The device of claim 1, comprising the at least one processor.

3. The device of claim 1, comprising the at least one microphone.

4. The device of claim 1, wherein the altering comprises: reducing audio volume of the AVD.

5. The device of claim 1, wherein the altering comprises: pausing presentation of content on the AVD.

6. The device of claim 1, wherein the altering comprises: steering at least one microphone toward a source of the voice input.

7. The device of claim 1, wherein the altering comprises: allowing for audio control of the AVD independently of audio control of a hearing aid to which the AVD streams audio.

8. A method, comprising:
establishing a first audio mode in an audio video presentation system (AVPS), the first audio mode comprising a standalone mode in which an audio video display device (AVDD) outputs audio on at least one speaker of the AVDD;
establishing a second audio mode in the AVPS in which the AVDD streams audio to at least one hearing aid paired with the AVDD but does not stream ambient sound detected by at least one microphone of the AVPS to the hearing aid; and
establishing a third audio mode in the AVPS in which the AVDD streams audio to at least one hearing aid paired with the AVDD and also streams ambient sound detected by at least one microphone of the AVPS to the hearing aid.

9. The method of claim 8, comprising:
responsive to detecting speech satisfying a criteria, reducing audio volume output by the AVDD; and
responsive to not detecting speech for a threshold period, increasing audio volume output by the AVDD.

10. The method of claim 8, comprising:
responsive to detecting speech satisfying a criteria, pausing content output by the AVDD; and
responsive to not detecting speech for a threshold period, resuming play of content output by the AVDD.

11. The method of claim 8, comprising:
responsive to voice input matching a first command, altering audio presentation associated with an audio video program being presented on the AVDD, the altering comprising one or more of:
reducing audio volume of the AVDD;
pausing presentation of content on the AVDD;
steering at least one microphone toward a source of the voice input;
allowing for audio control of the AVDD independently of audio control of a hearing aid to which the AVD streams audio.

12. The method of claim 11, wherein the altering comprises:
reducing audio volume of the AVDD.

13. The method of claim 11, wherein the altering comprises:
pausing presentation of content on the AVDD.

14. The method of claim 11, wherein the altering comprises:
steering at least one microphone toward a source of the voice input.

15. The method of claim 11, wherein the altering comprises:
allowing for audio control of the AVDD independently of audio control of a hearing aid to which the AVD streams audio.

16. An audio video assembly (AVA), comprising:
at least one display for presenting video under control of at least one processor;
at least one speaker for presenting audio under control of at least one processor; and
at least one storage comprising instructions executable by at least one processor to:
establish a first audio mode in the AVA in which an audio video display device (AVDD) of the AVA streams audio to at least one hearing aid paired with the AVDD but does not stream ambient sound detected by at least one microphone of the AVA to the hearing aid; and
establish a second audio mode in the AVA in which the AVDD streams audio to at least one hearing aid paired with the AVDD and also streams ambient sound detected by at least one microphone of the AVA to the hearing aid.

17. The AVA of claim 16, wherein the instructions are executable to:
establish a third audio mode in the AVA in which the AVDD outputs audio on at least one speaker of the AVDD and does not stream audio to the hearing aid.

18. The AVA of claim 16, wherein the instructions are executable to:
responsive to detecting speech satisfying a criteria, reduce audio volume output by the AVDD; and
responsive to not detecting speech for a threshold period, increase audio volume output by the AVDD.

19. The AVA of claim 16, wherein the instructions are executable to:
responsive to detecting speech satisfying a criteria, pause content output by the AVDD; and
responsive to not detecting speech for a threshold period, resume play of content output by the AVDD.

20. The AVA of claim 16, wherein the instructions are executable to:
responsive to voice input matching a first command, alter audio presentation associated with an audio video program being presented on the AVDD, the altering comprising one or more of:
reducing audio volume of the AVDD;
pausing presentation of content on the AVDD;
steering at least one microphone toward a source of the voice input;
allowing for audio control of the AVDD independently of audio control of a hearing aid to which the AVD streams audio.

* * * * *